(12) United States Patent
Waites

(10) Patent No.: US 9,747,332 B2
(45) Date of Patent: *Aug. 29, 2017

(54) AUDIO PLAYLIST SYSTEM AND METHOD

(71) Applicant: Nigel Waites, Lakeville, MN (US)

(72) Inventor: Nigel Waites, Lakeville, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 1038 days.

This patent is subject to a terminal disclaimer.

(21) Appl. No.: 13/969,203

(22) Filed: Aug. 16, 2013

(65) Prior Publication Data

US 2013/0339384 A1   Dec. 19, 2013

Related U.S. Application Data

(60) Division of application No. 12/770,952, filed on Apr. 30, 2010, now Pat. No. 8,533,050, which is a
(Continued)

(51) Int. Cl.
*G06Q 30/06*   (2012.01)
*G06F 17/30*   (2006.01)
(Continued)

(52) U.S. Cl.
CPC .. *G06F 17/30424* (2013.01); *G06F 17/30749* (2013.01); *G06F 17/30761* (2013.01);
(Continued)

(58) Field of Classification Search
USPC ............................................. 705/26.1, 27.1
See application file for complete search history.

(56) References Cited

U.S. PATENT DOCUMENTS 5,949,492 A    9/1999  Mankovitz
7,065,287 B1 * 6/2006  Heredia ................ G11B 19/02
                                                     348/E5.002
(Continued)

OTHER PUBLICATIONS

OpenGlobe offers hardware vendors choices for digital media managing. Anonymous. This Week in Consumer Electronics; New York16.7 (Mar. 19, 2001): 32. Downloaded from ProQuestDirect on the Internet on Mar. 27, 2017, 3 pages.*
(Continued)

*Primary Examiner* — James Zurita
(74) *Attorney, Agent, or Firm* — Tysver Beck Evans, PLLC

(57) ABSTRACT

Information about desired songs is collected on a portable memory device in communication with a radio tuner. The radio tuner may receive signals from a terrestrial or satellite digital radio transmission, or from an analog radio transmission. These transmissions may include text data about the current song being played. Upon activation by a user, song data is stored on the memory device. The memory device is then connected to a computer system, which uses software to extract the song data and uniquely identify the song. The identified songs are stored on the computer system, and can be used to allow the user easy access to the identified song through prior art techniques. If no textual data is stored about a song, the song is identified by identifying the radio station that played the song and the time at which the user activated the mechanism.

8 Claims, 4 Drawing Sheets

Related U.S. Application Data continuation of application No. 11/227,265, filed on Sep. 15, 2005, now Pat. No. 7,739,152.

(51) Int. Cl.
| | |
|---|---|
| *G06Q 40/04* | (2012.01) |
| *H04H 60/37* | (2008.01) |
| *H04H 60/65* | (2008.01) |
| *H04H 60/74* | (2008.01) |
| *G06Q 30/08* | (2012.01) |
| *H04H 60/40* | (2008.01) |
| *H04H 60/44* | (2008.01) |
| *H04H 60/63* | (2008.01) |

(52) U.S. Cl.
CPC ... *G06F 17/30772* (2013.01); *G06Q 30/0617* (2013.01); *G06Q 40/04* (2013.01); *H04H 60/372* (2013.01); *H04H 60/65* (2013.01); *H04H 60/74* (2013.01); *H04H 60/40* (2013.01); *H04H 60/44* (2013.01); *H04H 60/63* (2013.01); *H04H 2201/13* (2013.01)

(56) References Cited

U.S. PATENT DOCUMENTS

| | | | |
|---|---|---|---|
| 7,447,488 | B2 | 11/2008 | Howard et al. |
| 2005/0020223 | A1 | 1/2005 | Ellis et al. |
| 2005/0198193 | A1 | 9/2005 | Halme |

OTHER PUBLICATIONS

Bond, Amy, Function, features, looks take forefront in electronics. Star—Gazette; Elmira, N.Y. [Elmira, N.Y]Feb. 23, 2003: BB.3. Downloaded from ProQuestDirect on the Internet on Mar. 27, 2017, 6 pages.*
Palenchar, Joseph, Gracenote plans CDDB expansion in CE products. This Week in Consumer Electronics; New York17.14 (Jun 17, 2002): 38. Downloaded from ProQuestDirect on the Internet on Mar. 27, 2017, 4 pages.*
The Great Entertainer—Sony Ericsson Unveils Latest Walkman(R) Phone, Anonymous. Business Wire; New York [New York]Nov. 6, 2007. downloaded from ProQuestDirect on the Internet on May 14, 2017, 7 pages.*
Feb. 11, 2013 USPTO Office Action (U.S. Appl. No. 12/770,952).
Jul. 5, 2013 International Office Action (Serial No. 2,622,223).
dMarc Networks Launches DRDS(TM) 'Radio Text' for Cars in Partnership with Clear Channel Los Angeles.
Mayfield, Dave, Two Local Stations About to Broadcast for 'smart' radios the industry expects the message system to become widely used. Virginian—Pilot [Norfolk, VA] Jul. 30, 1993: D3, downloaded from ProQuest Direct on the Internet on Feb. 7, 2013, 2 pages.
Schlegel, Darrin. Era of Digital Radio Imminent as Stations are Eagar to Boost Sound Quality. Knight Ridder Tribune Business News [Washington] Nov. 29, 2002: 1, downloaded from ProQuestDirect on the Internet on Feb. 7, 2013, 2 pages.
Wireless Users Can Now Easily Access Websites on a Mobile Phone Keypad. PR Newswire [New York] Apr. 25, 2001: 1, downloaded from ProQuestDirect on the Internet on Feb. 27, 2013, 2 pages.
Emediacy debuts jmpat for wireless internet, Telephone IP News 12.6 (Jun. 1, 2001): 1, downloaded from ProQuestDirect on the Internet on Feb. 7, 2013, 2 pages.
Mar. 14, 2012 EU Search Report.
Aug. 28, 2007 PCT Search Report (PCT/US2006/35686).
beoworld.co.uk, Radio Data System, Aug. 5, 2005, http://www.beoworld.co.uk.rds.htm.
Broadcast Electronics, Data Generation and Management, Aug. 5, 2005, http://www.bdcast.com/TRE/index.html.
Broadcast Electronics, Now Playing Plus, Aug. 5, 2005, http://www.bdcst.com/TRE/Now_Playing_Plus.html.
Broadcast Electronics, Now Playing, Aug. 5, 2005, http://www.bdcast.com/TRE/Now_Playing.html.
Broadcast Electronics, Rdi 10 and RDi20, Accelerated RDS Generators, Aug. 5, 2005, http://www.bdcast.com/TRE/RDi.html.
Gracenote, Gracenote Mobile MusicID, licensing@gracenote.com.
Oregan Networks, DLNA Client and Server, Aug. 17, 2005, http://www.oregan.net/dma.html.
rds.org, What is RDS?, Aug. 5, 2005, http://www.rds.org.uk/rds98/whatisrds.htm.
rdslist.com, The Ultimate Radio Data System List, Aug. 12, 2005, http://www.rdslist.com/freq/97.php.
rdslist.com, The Ultimate Radio Data System List, Aug. 12, 2005, http://www.rdslist.com/update.php.
Skip Pizzi, A New Scrolling Display Livens Up RDS Radios, RWOnline, Jan. 14, 2004, http://www.rwonline.com/reference-room/skippizzi-bigpict/03_rwf_pizzi_rds_3.shtml.
wikipedia.org, Radio Data System, Aug. 5, 2005, http://en.wikipedia.org/wiki/Radio_Data_System.
Oct. 22, 2015 International Office Action (Serial No. 12150648.9).

* cited by examiner

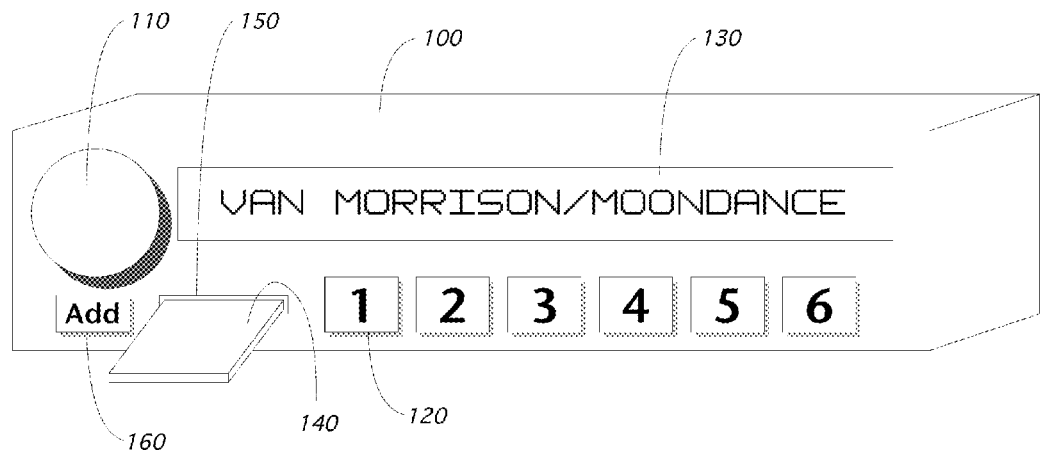

| Field | Contents |
|---|---|
| PI: Program Info | Identifies radio station, not displayed |
| PS: Program Service Name | Eight ASCII characters to display name of radio station on display. Relayed in every group |
| AF: Alternative Frequencies | Provides alternative frequencies for current program to allow automatic selection of stronger signals |
| TP: Traffic Program | Bit informs receiver whether station regularly broadcasts traffic information |
| TA: Traffic Announcement | Indicates traffic announcement is being made, to allow for automatic switching to traffic announcement |
| TIC: Traffic Information Channel | Character message regarding current traffic conditions |
| PTY: Program Type | Coded to indicate which of 31 program types (childrens, news, etc.) is being broadcast |
| CT: Clock and Time | Provides time information for automatic time synchronization |
| TDC: Transparent Data Channel | Data not suitable for ASCII display, such as graphics or database updates |
| RT: Radio Text | 64 ASCII characters that provide information about current programming, such as title and artist of song | ns
AUDIO PLAYLIST SYSTEM AND METHOD

RELATED APPLICATIONS

This application claims is a divisional application of U.S. patent application Ser. No. 12/770,952, filed on Apr. 30, 2010, which is itself a continuation application of U.S. Pat. No. 7,739,152, filed on Sep. 15, 2005 and issued on Jun. 15, 2010.

FIELD OF THE INVENTION

The present invention relates to the field of radio music distribution. More particularly, the present invention relates to a technique of developing a playlist of music heard over a radio receiver, and the utilization of the playlist to purchase or license the music.

BACKGROUND OF THE INVENTION

Since the advent of music transmission over AM radio, there has been a desire for users to remember the names of the songs that they heard and enjoyed. One simple technique is to write down the song title and artist with pencil and paper. Once tracked, the user could then request that the song be played again by the radio station, discuss the song with acquaintances, or purchase the music through a retail outlet.

This need to remember a song title has not changed significantly in today's more technical era. It is true that today's consumers have more options for obtaining the song once identified, such as the music download service provide by Apple Computer Corp. (Cupertino, Calif.), the e-commerce web site by Best Buy Co., Inc. (Richfield, Minn.), or the subscription service provided by Napster, Inc. (Los Angeles, Calif.). However, the user is still required to manually track the songs and artists that they enjoy.

SUMMARY OF THE INVENTION

The present invention automates the process of collecting information about desired songs. In the preferred embodiment, a mobile radio tuner receives information about a currently playing song. This information may be displayed on a display to a user. The radio tuner contains a mechanism such as an "Add" button that a user may activate to indicate that they particularly enjoy the current song. The tuner then causes the song information that it has received to be stored in a storage mechanism controlled by the user. In one embodiment, the storage mechanism is a portable, solid-state memory device, such as a flash memory device. The memory device may have a physical interface mechanism that interfaces with the radio tuner. Alternatively, the flash memory card may have a wireless communication interface to the tuner, such as that provided by Bluetooth technology. The tuner itself can be an FM radio tuner, a satellite radio that receives digital data with the music signal, or a terrestrial digital radio system that also receives digital song data with the music signal. In a still further embodiment, the memory device could be a portable music play that has an interface to the radio tuner and a storage component that stores the song information.

The user may activate the Add button as many times as desired when listening to the radio. Each activation adds information about the current song to the memory device. The device allows the user to access their desired song list (or "playlist"). A software program on a computer system reads the memory device, identifies the desired songs, and then provides an interface through which the user could access the songs. Such interfaces include the ability to purchase a physical copy of the music, download a digital version of the music, or interact with a subscription based music service to create playlists containing the indicated songs. The computer also adds the songs indicated on the memory device to a preferred song list stored on the computer, and then erase the songs on the memory device.

BRIEF DESCRIPTION OF THE DRAWINGS

FIG. 1 is a perspective view of a radio receiver utilizing the present invention.

FIG. 2 is a table of the fields in the RDS/RBDS signal.

DETAILED DESCRIPTION OF THE INVENTION

Overview of the System

Figure 3:
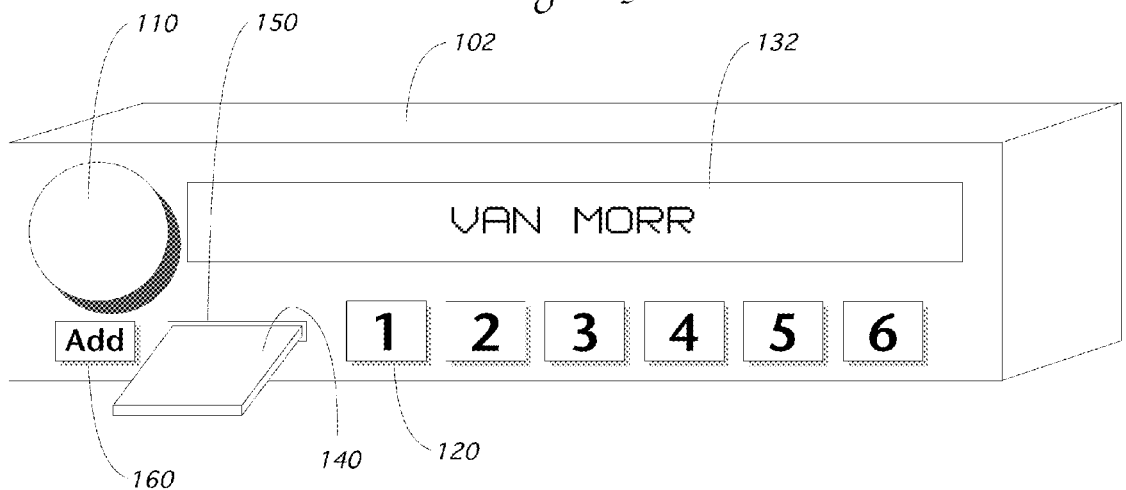
FIG. 3 is a perspective view of an alterative radio receiver utilizing the present invention.

FIG. 1 shows a radio 100 of the present invention. The radio 100 is in most respects a typical radio receiver, including a volume/power control 110 and radio station preset buttons 120. The radio contains a display 130 on which text can be displayed to a user. This text includes information that is standard on any radio receiver, such as the current volume or balance setting. The display 130 may also be used to display information received from the radio signal transmitter. Analog FM radio stations, for instance, frequently send text data along with their music signal using the Radio Data System ("RDS"). RDS is widely used in Western Europe, and has been slightly modified in the United States into the Radio Broadcast Data System (RBDS). RDS and RBDS both send digital data on a subcarrier added to the FM stereo multiplex signal, and differ only in the definition of some of the fields in the data system.

Some of the common data fields sent in both RDS and RBDS are listed in table 200 of FIG. 2, with the field name and identifier 210 appearing on the left of table 200 and the contents 220 of the field appearing on the right. These fields include station identification data in the Program Info ("PI") field and the program service ("PS") field. The Program Info field uniquely identifies a radio station, but is generally not displayed. In Europe, the identifier transmitted in this field is pre-assigned to each radio station, while in the United States the PI field is determined using a conversion algorithm that mathematically converts the call letters assigned to the station by the federal government into a unique identifier. The PS field can be chosen by the station itself and often reflects the station's advertised identity, such as "HOT107.7" or "THEDRIVE." Since these fields were designed for identification, the original design of RDS/RBDS assumed that both of these fields would contain static, non-changing information.

The Alternate Frequencies field (AF) is used to send information about other frequencies that carry the same content as the transmitting signal, which would allow a receiver 100 to automatically switch to the strongest available signal for a particular program. The traffic related fields (TP, TA, TIC) are used to transmit traffic information to drivers. The program type (PTY) field describes the type of programming currently being presented by the radio station, such as "Rock," "News," or "Talk." These types are predefined into 32 categories, and the RDS types are defined differently than the RDBS types. The time signal (CT) carries a time signal that can be used by receivers 100 to reset their clocks, and the transparent data channel (TDC) can be used to send non-textual data, such as graphics or data updates, to radio receivers.

The RT or Radio Text field 210 was designed to transmit information about the currently playing song. This field contains 64 ASCII characters, and is able display both an artist and a song title. The receiver 100 of FIG. 1 is shown displaying both the artist and title for the song "Moondance," as might be taken directly from the RT field. Some stations may choose to implement the RT field in the form of "Artist/Title"; others may choose "Title by Artist," or "Artist/Title/Station ID." In order to avoid having to track and transmit any information relating to the current song, a station might elect to simply transmit a static station identifier in the RT field.

Many automobile manufacturers have been reluctant to install radio tuners in their automobiles that can display song information because they are concerned about distracting drivers. Therefore, many of the pre-installed radio tuners that do receive RDS or RBDS data will not display any RT information, but instead will display only the eight-character program service name field (PS). Many North American radio stations have responded to this limitation by transmitting "dynamic PS" data. These stations transmit frequently changing PS fields in their DBDS data stream so as to include the same song information that would otherwise exist in the RT field. FIG. 3 shows a second receiver 102 that is displaying a dynamic PS field. The PS field display 132 in this receiver 102 is showing only that part of the song identification that was most recently received in the eight-character PS field. This display 132 will scroll through the entire song information as the transmitting radio station sends additional data segment to the receiver 102 over the PS field. At each refresh, the display 132 can change to the next eight characters in the message, or can roll one or more characters to the left, depending on the implementation of the radio station.

In the above description, it has been assumed that the receivers 100, 102 were receiving analog FM signals augmented with digital RDS/RBDS data. However, it is well within the scope of the present invention for the receivers 100, 102 to receive digital music signals, such as the digital FM signals defined by the DAB standard in western Europe and Canada, or the HD Radio standard of the United States. These standards define the terrestrial digital signals that are to be transmitted in these geographies, and include specifications for the digital metadata that is transmitted with the music. DAB uses a standard known as Dynamic Label Segment (DLS) to send song and artist information to the radio receiver 100 as text characters. HD Radio has a similar feature. Alternatively, the receiver 100 could receive satellite radio signals such as XM Satellite Radio or Sirius Satellite Radio. Each of these services also provides textual information about the current artist and song title being played.

The present invention takes advantage of this data to automate the process of developing a favorite song list (or "playlist") while a user is listening to a radio broadcast. The system works in connection with portable memory device 140 that is in communication with the receiver 100 or 102.

This communication can occur through a physical interface between the memory device 140 and the receiver 100, such as a slot 150 within the receiver 100 that receives the memory device 140. In the preferred embodiment, the slot 150 is on the front face of the receiver 100 to aid in the insertion and removal of the memory device. The memory device 140 is preferably a solid-state memory device, such as a flash memory device that does not loose its contents in the absence of electrical power. Once the memory device 140 is connected to the receiver 100, the user can store information about a currently playing song simply by pressing the "Add" button 160 that is conveniently located on the radio receiver 100. Upon pressing this button, the receiver 100 stores textual information about the current song on the memory device 140.

The actual information stored on the memory device 140 will vary depending on the uniformity and adequacy of the information available to the receiver 100. For instance, when the receiver 100 is receiving satellite radio transmissions, the information on the artist and song title is almost always present and is formatted in a consistent way. In these circumstances, it is a simple matter to store this information on the memory device 140 in a known format that can be easily retrieved. Typically, this information will be stored on the memory device 140 in the form of a data record, which is defined to be a logical grouping of different data elements related to a single song. In the preferred embodiment, the song record will contain the song title, the artist, the song type (such as "Rock" or "Rap"), the radio station on which the song was heard, the type of radio signal (i.e., HD Radio), and the date and time at which the song was heard. This information is easily retrievable from a terrestrial or satellite digital radio signal.

However, when the data has been received over an analog radio signal, this song information may not be as easily identifiable. In an RDS or RBDS data stream, the song's title and artist may be found in the RT field in any one of numerous formats, such as those described above. Alternatively, the information may be available only in the dynamic PS fields. It is even possible that the song title and information is not available, either because it is not transmitted with the RDS or RBDS data stream, or because the radio station has not implemented this data stream.

In these cases, the present invention must store as much information that is available to it onto the memory device 140, and then use the processing power of a computer to later determine the song title and artist from the stored information. In the preferred embodiment, when a radio station is transmitting RDS/RBDS data, the radio receiver 100 will store the following fields on the memory device: PI, PS, PTY, CT, and RT. Since the RT and PS field may be dynamic (changing over time to send a complete message), the receiver 100 will monitor and save all of the data received in these fields until the text in the field repeats.

Once this information is stored, the receiver resumes normal operation until the next time the "Add" button 160 is depressed. Of course, many types of activation mechanisms may be used to trigger the storage of song information in addition to a button 160 located on the receiver. For instance, a remote button may be placed on the steering column or on the memory device 140 itself, or a voice activation system may be programmed with an appropriate voice command.

Figure 4:
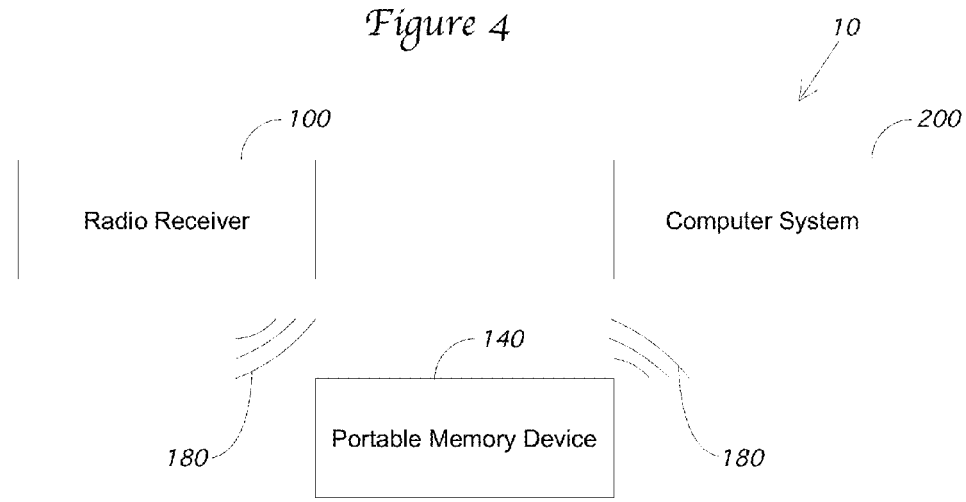
FIG. 4 is a schematic view of a radio receiver, portable memory device, and computer system interacting wirelessly to implement the present invention.

Once the data is stored on the portable memory device 140, it is accessed by a separate computer system 200 that forms an integral part of the system 10 of the present invention. This computer 200 is shown in FIG. 4 along with a receiver 100 and the portable memory device 140. The computer 200 is shown separately from the receiver 100, since the present invention is most useful in environments where the radio receiver 100 is unrelated to and physically separate from the computer 200. As explained above, the portable memory device may have a physical connection to the receiver 100, such as through slot 150. Alternatively, the memory device 140 may have a wireless communication interface to the tuner, such as that provided by Bluetooth technology 180. While this wireless interface increases the cost and complexity of the portable memory device 140, it would be a simple matter to integrate the functionality of the present invention memory device 140 into a device that already contains this complexity, such as a cellular telephone. When the memory device 140 uses a wireless connection 180 to the receiver, the same wireless connection can be used to connect the memory device 140 with computer 200. Alternatively, a physical connection can exist between the computer 200 and the memory device 140.

Figure 5:
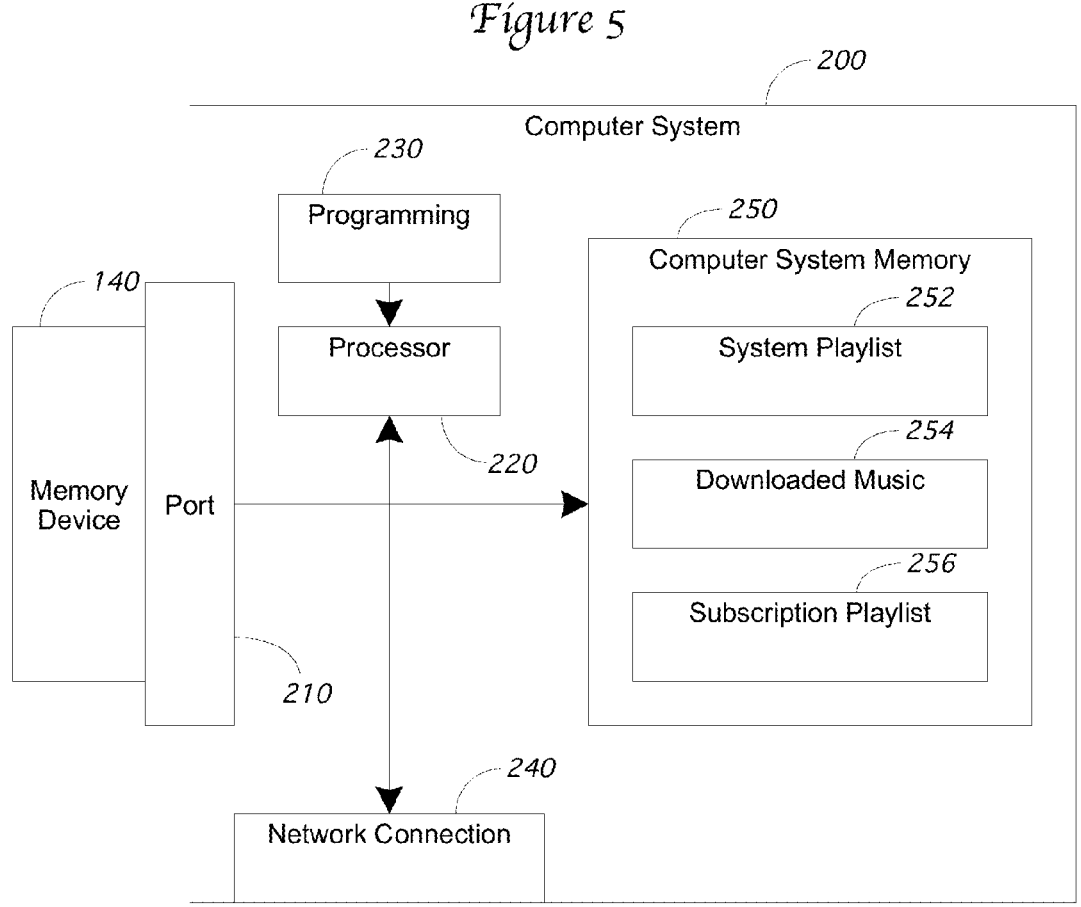
FIG. 5 is a schematic view of the system of the computer system shown in FIG. 4.

The computer system 200 is shown in more detail in FIG. 5. The system 200 has a memory device port 210 for interfacing with the portable memory device 140. This can either be a standard physical port such as a USB or USB2 port, or a wireless technology port. In most cases, the physical ports on a computer system 200 require a "reader" to convert between the physical port protocol used by the computer 200 and the physical interface protocol of the memory device 140 (such as Compact Flash Card, Secure Digital Card, XD, etc.). However, the conversion circuitry in such a reader is increasingly likely to be integrated inside the chassis of a computer system 200. Consequently, the port 210 in FIG. 5 is shown without any physical "reader" hardware.

The memory device 140 is read by the processor 220 that analyzes the data on the device 140 according to programming 230 found on the computer system 200. The programming 230 is designed to identify the songs stored on the memory device 140, and is explained in more detail in connection with FIG. 6 below. This programming 230 may exist within computer system memory 250, thereby allowing computer 200 to operate on a general purpose operating system such as the Linux, Windows, or Mac operating systems. Programming 230 is shown outside this memory 250 to emphasis that it could take the form of firmware built into a partially dedicated computer system and still be within the scope of the present invention.

To aid in identifying the songs in the song records stored on memory device 140, the processor 220 has access to a network connection 240, through which the processor can query commercial and non-profit databases. One such database is the Gracenote Global Music Database (formerly CDDB, provided by Gracenote, Inc. of Emeryville, Calif.), which provides a comprehensive database of song titles and artists. Another useful database that can be accessed over the network connection 240 contains information on radio stations, such as their PI field identifier and the format of their PS and RT fields. This information is publicly available, and could be obtained either from a third party service provider or could be generated and maintained as part of implementing system 10 of the present invention. This same database may also contain a time-indexed database of songs identifying the song title, artist, date, and time of every song played by a radio station.

Using the programming 230 and external data sources obtained through network connection 240, the processor 220 identifies each of the songs stored in the song records on memory device 140. This information is then stored in the computer system memory 250, specifically in the system playlist 252 that contains all of the songs identified by the present invention system 10.

In addition, the processor 220 can use the information about the identified songs to assist a user in accessing the selected songs. For instance, the programming 230 may instruct the processor 220 and network connection 240 to link the user to an e-commerce web site that allows the user to purchase a physical copy of a song or a collection of songs. One such e-commerce site is found at www.BestBuy.com, which is maintained by Best Buy Co., Inc., the assignee of the present invention. Such sites may also offer downloads of individual songs, where electronic versions of the songs are purchased and received via the network connection 240. These downloaded songs are generally stored in an area 254 of the computer system memory 250, and can usually be burned onto optical media or loaded onto portable players for enjoyment away the computer system 200. Alternatively, the processor 220 may interact with a subscription based music service to create playlists containing the indicated songs. The songs identified from the memory device could be automatically added to a preferred playlist 256 stored in the computer system memory 250. The next time the user accesses the subscription service, the identified songs will appear on one of their preferred playlists for easy playback or for loading onto a portable music player. Each of these methods of accessing the identified song ideally will prefer without additional interaction of the user with the computer 200. In this way, the computer 200 can automatically identify the songs desired by a user simply by establishing a link with the user's portable memory device 140, and access to the identified song can be automatically given to the user by the computer 200. The type of access provided can be chosen by the user in the preference settings of the programming 230.

Figure 6:
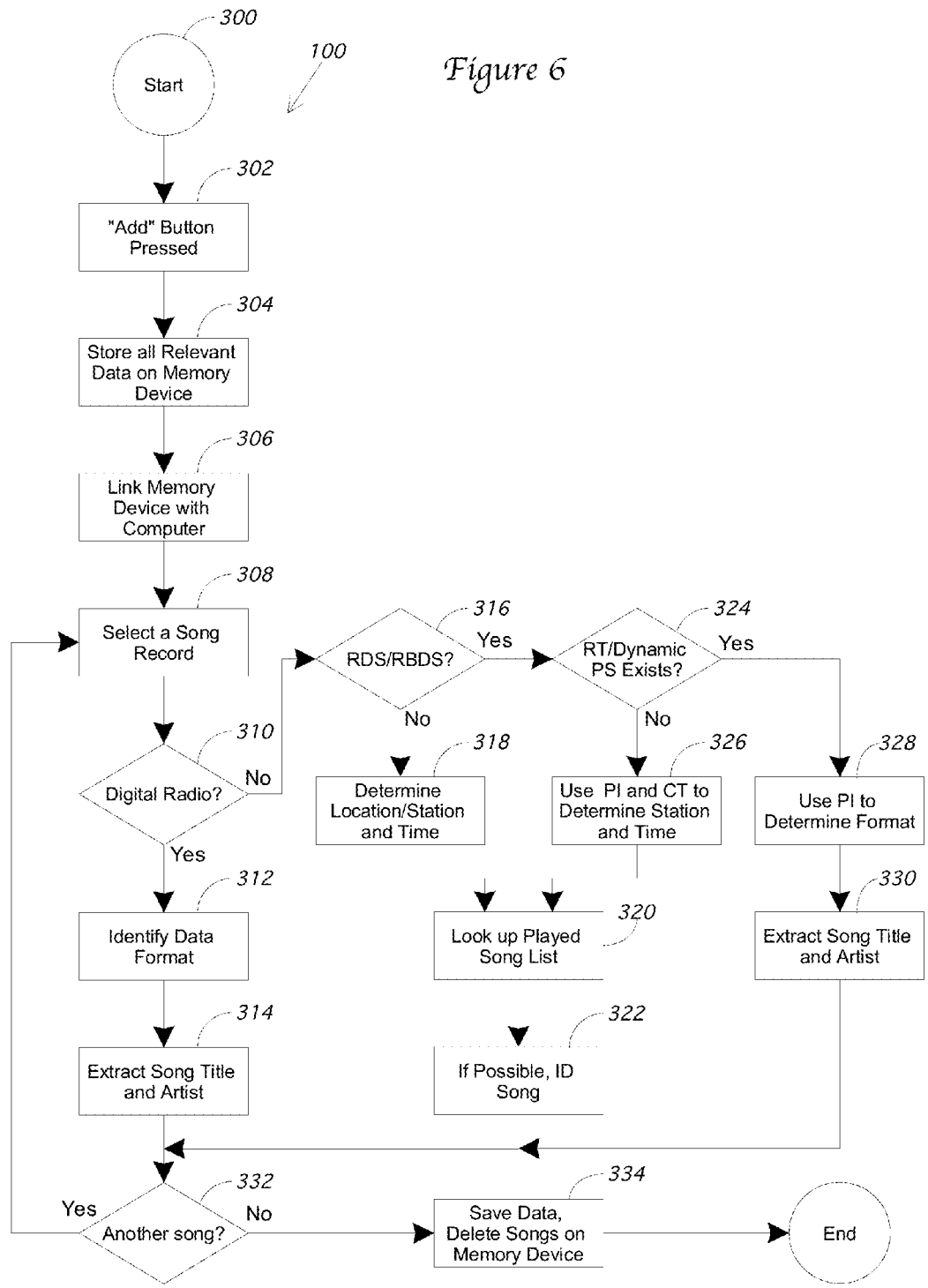
FIG. 6 is a flowchart of the present invention process.

The process 300 used by the present invention is shown in FIG. 6. This process 300 is partially implemented in the computer system 200 by the programming 230, although parts of the process 300 involve the interaction of the radio receiver 100 and the portable memory device 140. The process begins with the memory device 140 in communication with the receiver 100 when a user presses the "Add" button 160 on the receiver 100 in step 302. As explained above, this step 302 may be implemented with a variety of mechanisms other than a simple button, as long as the mechanism involves a user affirmatively asserting a desire to store information about the currently playing song.

Once the button 160 is pressed, the receiver 100 stores relevant information about the song as a data record on the memory device 140 in step 304. Steps 302 and 304 may take place many times, or only a single time, as desired by the user.

In step 306, the user removes the memory device 140 from communication with the receiver 100 and links the memory 140 with the computer system 200. The processor 220 then accesses data related to a single song data record in step 308. The computer system 200 must then determine the type of data found in that record. The data may have originated from a digital radio source, such as a terrestrial DAB or HD Radio broadcast or a satellite radio transmission. In this case, it will be relatively easy to identify the song information in the data record. At step 310, the computer system 200 determines whether this was the case by examining the data record. In the preferred embodiment, the receiver 100 will place an identifier in the record itself to aid in the identification of the radio transmission type.

If the record did come from a digital radio transmission, step 312 identifies the data format using the programming 230 in the computer system. This format is then used at step 314 to extract the song title and artist from the data record.

If step 310 indicates that the record came from an analog transmission, then the computer system 200 must determine at step 316 if RDS or RBDS data is stored in the data record. If not, the system 10 needs to use another technique to identify the song. One technique is to have the receiver store the tuning information and clock time to the memory device. The system would then extract that information from the record at step 318, and then access an external database at step 320 to look up the song played by that station at that time. The database would then return text identifying the song title and artist in step 322. Obviously, the tuning information will uniquely identify a radio station only if geographic information is also known about where the signal was received. The radio receiver 100 can determined this geographic information using known or future techniques, such as through a global positioning system built into the radio receiver 100 or a connected auxiliary device such as an automotive navigation system. The receiver 100 can then store that geographic information on the memory device in the song record. Alternatively, the computer system 200 can simply ask the user to identify the geographic area in which the song list was generated.

Alternatively, the tuner could store a digitized portion of the actual song to the memory device. The identification of songs based upon a digital analysis of the song itself is known in the prior art, and is available as a commercial service from Gracenote, Inc. under the service name "Mobile MusicID." In this alternative embodiment, a short song sample (as short as 3 seconds) could be stored on the memory device 140, submitted to the external music identification service by the computer system, and the text of the song title and artist could be returned from the service via the network connection 240.

If step 316 determines that RDS or RBDS data is stored in the song record, then step 324 determines whether the song title and artist are found in either the RT field or the (dynamic) PS field contents in the song record. If not, this means that although the receiver 100 received RDS/RBDS data from the station, the station was not broadcasting song title and artist information. In this case, the computer system 200 will, at step 326, use the PI field to uniquely identify the station and the CT field to identify the time that the song was playing. This information can then be submitted using the same database used by the process 300 in the case of an analog broadcast at step 320, and the song title and artist will be received at step 322.

Step 324 may determine that the song title and artist information is contained in the PI or RT field. In this case, step 328 uses the PI field to identify the transmitting station and, consequently, the format and the field used by this particular station to transmit song data. Format information for each radio station can be obtained through an external database, or, since it is relatively static information, can be stored as a local database in the computer system memory 250 and periodically updated by the processor 220 and network connection 240. Once the format is identified, the song title and artist can be extracted from the appropriate field in step 330. In the case of the dynamic PI field, it may be the case that the information is stored in multiple iterations of the field. The programming 230 is preferably designed to reconstruct the multiple iterations into a single data string before the data is extracted. This can be accomplished simply by appending the iterative fields together if each iteration contains a new subset of the text message sent by the radio station, or by extracting only the additional character or characters found within each subsequent iteration if each iteration simply scrolls one or more characters to the left or right.

After the song title and artist are extracted or determined in steps 314, 322, or 330, step 332 determines if any more song records exist on the memory device 140. If so, the process returns to step 308 to process the next song. If not, step 334 saves the song title and artist information from all of the song records to the system playlist 252 in memory 250, and then deletes the song records from the portable memory device 140. At step 336, the process 300 will automatically provide access to the identified songs to the user. The process 300 will then end.

As explained above, it is anticipated that the programming 230 and processor 220 would then use the list of identified songs in the system playlist 252 to access an e-commerce site, a music download service, or to update a subscription service playlist 256 according to the preferences of the user. In this way, the present invention greatly aids the user in the automatic identification of songs heard over a radio receiver 100, and in utilizing this information to purchase, license, or otherwise access the identified songs. In fact, the obtained songs could be stored directly on the portable memory device 240, which allows the text data to be automatically converted to a playable song list. The songs on the memory device 240 could then be playable by the radio receiver 100 when the memory device 240 is reconnected with the receiver 100.

The many features and advantages of the invention are apparent from the above description. Numerous modifications and variations will readily occur to those skilled in the art. For instance, the storage device 140 could itself be a portable music player, such as the iPod™ player from Apple Computer (Cupertino, Calif.). The music player would interface with the radio tuner through a standard interface, such as a USB, Firewire, or Bluetooth connection. The text data stored on the music player would be transferred to the computer system 200 through the same interface. At this point, an additional option could be presented that would store the songs identified through the present invention and obtained through the computer system directly onto the music player that served as the portable memory device 140. At that point, the identified songs could be directly playable on the music device. In yet another alternative, the portable memory device 140 could be a writable optical disk such as a CD-R or a CD-RW. The text data would be placed onto the disk, and be transferred to the computer system 200 by inserting the optical disk into a compatible drive on the computer system 200. Since such modifications are possible, the invention is not to be limited to the exact construction and operation illustrated and described. Rather, the present invention should be limited only by the following claims.

What is claimed is:

1. A method for identifying a song based on data stored on a cellular telephone having a portable memory device comprising:
   a) providing the cellular telephone, the cellular telephone communicating via a Bluetooth signal with a radio receiver;
   b) receiving at the cellular telephone by the Bluetooth signal song data received by the radio receiver and storing the song data on the portable memory device;
   c) reading the song data from the portable memory device, the song data having been transmitted along with a song by a radio station over a radio signal to the radio receiver, the song data including:
  i) at least a portion of a song title,
  ii) at least a portion of an artist that performed the song, and
  iii) a radio station identifier indicating a radio station on which the song was heard, and
d) using the song data to query a database of song information.

2. The method of claim 1, wherein the radio station identifier includes the call letters for the radio station.

3. The method of claim 1, wherein the song data further includes a time identifier indicating the time at which the song was heard on the radio station.

4. The method of claim 3, wherein the database contains a listing of songs played at the radio station by time.

5. The method of claim 1, wherein the radio signal is chosen from the set comprising analog AM, analog FM, digital terrestrial signals, and digital satellite signals.

6. The method of claim 1, further comprising:
  e) using a computer to provide access to a song identified by the query of the database.

7. The method of claim 6, wherein the access provided to the identified song is chosen from the set of purchasing a physical copy of the identified song, adding a digital copy of the identified song to a playlist of a subscription music service, and downloading a digital copy of the identified song from a remote music download service to the cellular telephone.

8. The method of claim 1, wherein the song data from a plurality of the songs are stored on the portable memory device, wherein the plurality of songs were heard on radio stations at different times and are read from the portable memory device at the same time.

* * * * *

UNITED STATES PATENT AND TRADEMARK OFFICE
CERTIFICATE OF CORRECTION

| | | |
|---|---|---|
| PATENT NO. | : 9,747,332 B2 | Page 1 of 1 |
| APPLICATION NO. | : 13/969203 | |
| DATED | : August 29, 2017 | |
| INVENTOR(S) | : Nigel Waites | |

It is certified that error appears in the above-identified patent and that said Letters Patent is hereby corrected as shown below:

In the Specification

Column 2, Line 16:
Delete "alterative" and insert --alternative--, therefor.

Column 3, Line 7:
Delete "RDBS" and insert --RBDS--, therefor.

Column 3, Line 33:
Delete "DBDS" and insert --RBDS--, therefor.

Column 4, Line 8:
Delete "loose" and insert --lose--, therefor.

Signed and Sealed this
Fifth Day of June, 2018

Andrei Iancu
*Director of the United States Patent and Trademark Office*